UNITED STATES PATENT OFFICE.

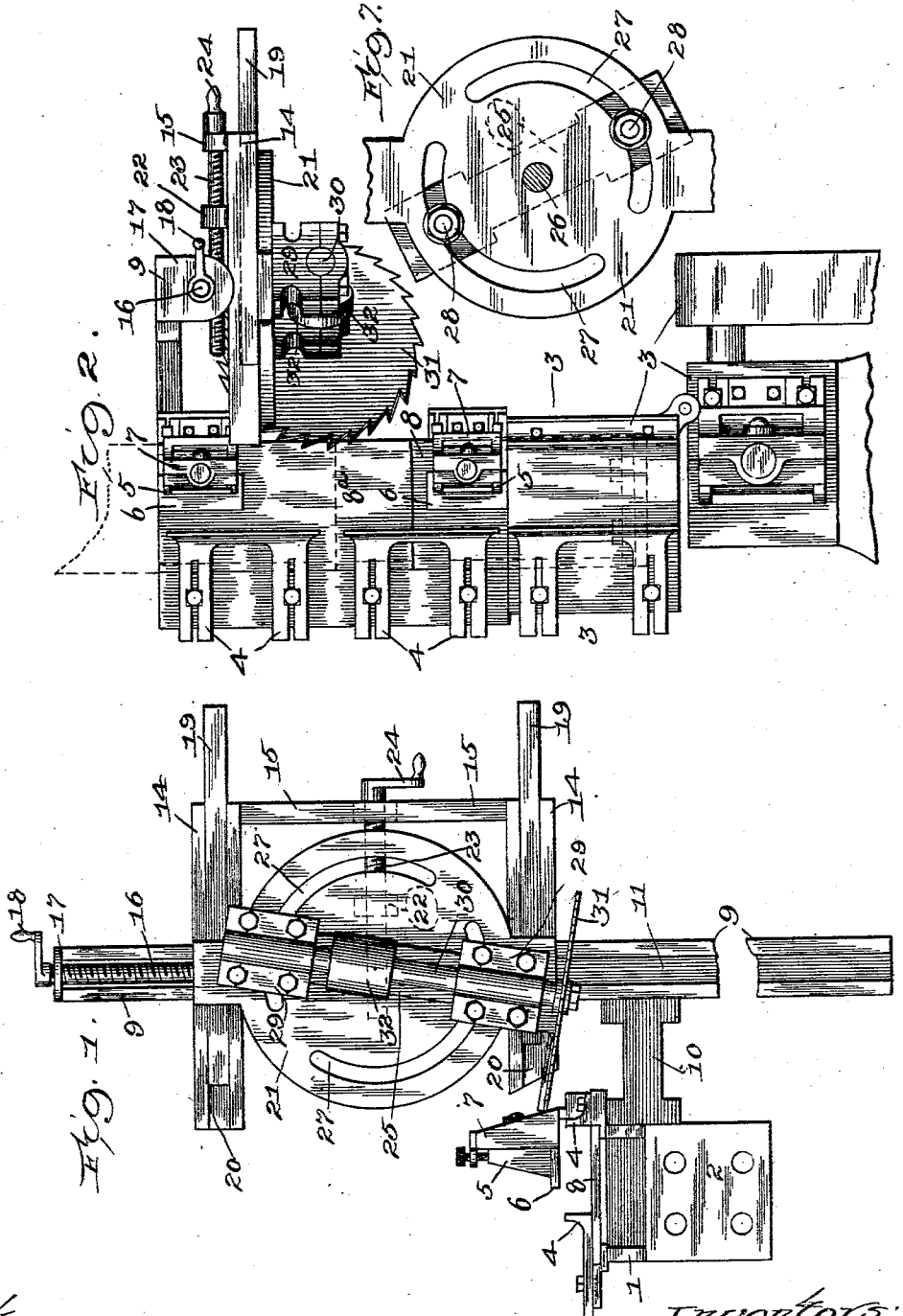

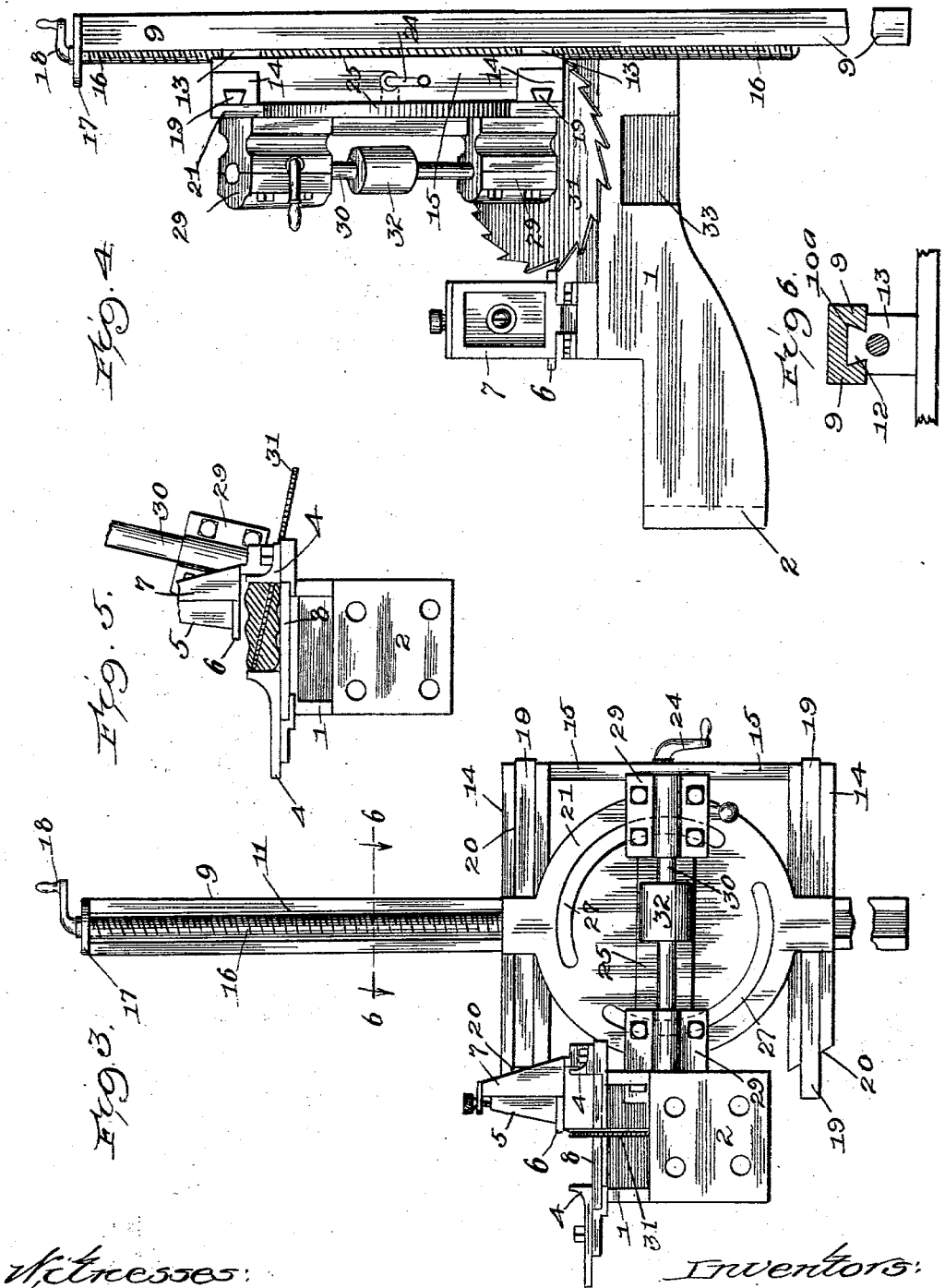

CHARLES STERBA AND WILLIAM J. WRIGHT, OF CHICAGO, ILLINOIS.

WOODWORKING-MACHINE.

SPECIFICATION forming part of Letters Patent No. 715,432, dated December 9, 1902.

Application filed January 25, 1902. Serial No. 91,217. (No model.)

*To all whom it may concern:*

Be it known that we, CHARLES STERBA and WILLIAM J. WRIGHT, citizens of the United States, residing in the city of Chicago, county of Cook, State of Illinois, have invented a new and useful Improvement in Woodworking-Machines, of which the following is a specification.

Our invention relates to woodworking-machines, and is especially designed to be attached to a molding-machine commonly known as a "sticker," the purpose of our machine being to resaw the molding as it comes from the molding-machine. We attain this object by the mechanism illustrated in the accompanying drawings, in which—

Figure 1 is a view of our machine in end elevation. Fig. 2 is a plan view showing our machine attached to a molding-machine. Fig. 3 is a view in end elevation of the universal head whereon the saw-shaft is mounted. In this figure the saw is shown in a position to make a vertical cut through the molding. Fig. 4 is a view of the machine in side elevation, the universal head being raised and also rotated from the position shown in Fig. 3, so as to show the saw in perspective. Fig. 5 is a fragmentary view showing the saw in the act of sawing the molding. Fig. 6 is a fragmentary view taken in section on the line 6 6, Fig. 3. Fig. 7 is a rear view of the slotted head-plate, showing the manner of mounting the saw-shaft thereon.

Similar numerals refer to similar parts throughout the several parts.

1 represents the framework of our machine, whereon the operating parts are mounted and which is secured by means of the bracket 2, bolted to the delivery end of a molding-machine 3, as shown in Fig. 2. Upon said framework 1 are mounted the gages 4 4 for guiding the molding in its passage through the machine.

5 5 are the presser-bars, which carry at their lower extremities the shoes 6 and are vertically adjustable in the presser-bar frames 7 7. Said bar-frames are bolted or otherwise suitably fastened to the main framework of the machine. The purpose of said vertically-adjustable shoes is to hold the molding down in place upon said table. The plate 8 lies upon and is fixed to the framework 1 and forms the table upon which the molding rests in its passage through the machine. The plate $8^a$ (shown in Fig. 2) is mounted in the top of the framework 1 in such a manner that it can be slid outwardly, so as to make room for the circular saw when the latter assumes a position beneath the table 8. When said saw is in any other position, said plate $8^a$ may be restored to its position in the frame, so as to form a continuous surface with said table.

The vertical guide 9 is located at one side of the main frame 1 and is secured thereto through the medium of the cross-frame 10. Said guide has the preferably dovetail vertical groove 11 for receiving the corresponding tongue 12 on the blocks 13, as best shown in Fig. 6. To said blocks 13 are fixed the horizontal guides 14, which are held in proper relation to each other by means of the cross-piece 15. The blocks 13 and guides 14 are moved vertically in the guide 9 by means of the threaded bar 16, supported from the bracket 17 at the upper extremity of said guide 9 and rotated by means of the crank 18. Said blocks 13 are threaded to receive said bar 16, so that when said bar is rotated said blocks 13 are moved vertically in said guide 9, carrying with them the guides 14. The preferably dovetail slides 19 travel within the corresponding slots 20 in the guides 14 and carry the slotted head-plate 21. Said head-plate and slides 19 are moved horizontally in the guides 14 by means of the block 22, which is threaded to receive the threaded bar 23. Said bar, which has a bearing in the piece 15 for preventing the horizontal movement of said bar 23, is rotated by means of the crank 24. When said crank is rotated, the said head-plate 21 is moved in a horizontal direction in the guides 14. The bracket 25 is revolubly secured to said head-plate 21 by means of the pin 26. The slots 27 in said head-plate are circular and concentric, and the studs 28 pass through said slots and enter the bracket 25 in such a manner that when said studs are loose said bracket is free to rotate upon said pin 26; but when said studs are tightened said bracket is held rigidly upon said plate. Said bracket 25 carries the boxes 29, wherein is mounted the saw-shaft 30, said shaft being free to rotate, but having practically no end play or lengthwise motion in said boxes. Said shaft carries at one extremity the circular saw 31 and is driven by means of the pulley 32.

Inasmuch as the head-plate 21 is adjustable both in a vertical and horizontal direction and the saw-bracket 25 may be adjusted to any desired angle of inclination it is evident that the saw 31 may be set, so that it may saw on any desired angle the molding on the table of the machine. In order to permit the saw to be moved to an approximately horizontal position beneath the table 8, so as to do what is known as "splitting" the molding, the frame 1 is cut away at 33, as shown in Fig. 4, to receive one of the boxes 29.

In operation as the molding comes out of the molding-machine 3 the molding passes onto the table 8, where it is guided by the gages 4. If now it is desired to make an approximately vertical cut through the molding, the guides 14 are lowered by means of the crank 18 to the position shown in Fig. 3. The guides 19 and plate 21 are then run in toward the table 8 by means of the crank 24, and the bracket 25 is adjusted so that the saw assumes the desired angle beneath said table. In a similar manner the saw may be set above the table to rip the molding in the manner shown in Fig. 5.

What we claim as new, and desire to secure by Letters Patent, is—

1. In a wood-sawing machine, the combination of a table whereon the wood travels, a fixed vertical guide located at one side of said table and extending both above and below the surface thereof; a framework vertically adjustable on said guide; a head-plate horizontally adjustable on said framework; a saw; a saw-shaft; and a bracket pivotally mounted on said plate for carrying said saw-shaft, said saw being thereby adjustable to points both above and below the table.

2. In a wood-sawing machine, the combination of a table whereon the wood travels, a fixed vertical guide located at one side of said table and extending both above and below the surface thereof; horizontal guides rigidly secured together and vertically adjustable on said vertical guide; slides working in said horizontal guides and adjustable therein; a head-plate fixed to said horizontal slides; a bracket revolubly supported on said plate; a saw-shaft mounted on said bracket and a saw on said shaft; said saw being adjustable to positions above and below the table and operative through an angle exceeding ninety degrees.

3. In a wood-sawing machine, the combination of a table whereon the wood travels; a horizontally and vertically adjustable saw located at one side of said table and revolubly adjustable in a plane transverse to the direction of travel of the wood; and a slot in said table for receiving said saw, said slot extending to the edge of the table adjacent to the saw.

4. In a wood-sawing machine, the combination of a table whereon the wood travels; a saw mounted at one side of said table and adjustable to positions above and below the surface of the table; means for adjustably translating said saw transversely to the table; other means for adjustably revolving said saw in a plane transverse to said table; a slot in said table for receiving said saw; and a removable plate for covering said slot when not in use.

5. In a resawing-machine the combination of a table; a fixed vertical guide located at one side of said table and extending above and below the surface thereof; parallel horizontal guides rigidly fixed with reference to each other; a hand-operated screw for adjusting said horizontal guides in said vertical guide; a head-plate adjustably mounted on said horizontal guides, a hand-operated screw for adjusting said head-plate on said horizontal guides; a bracket on said head-plate adjustable through an angle exceeding ninety degrees; means for adjusting said bracket about its pivot; a saw mounted upon said bracket; and a slot in said table for receiving said saw; said saw being thereby operative both above and below the table, and throughout an angle exceeding ninety degrees.

CHARLES STERBA.
WILLIAM J. WRIGHT.

Witnesses:
 CHARLES L. HERRICK,
 SADIE WOLF.